United States Patent

[11] 3,576,968

[72] Inventor Robert L. Collie, Orange County (2707 Catalina Drive, Orlando, Fla. 32805)
[21] Appl. No. 825,556
[22] Filed May 19, 1969
[45] Patented May 4, 1971

[54] ELECTRODE HEATING SYSTEM
10 Claims, 2 Drawing Figs.

[52] U.S. Cl. ................................. 219/284,
126/101, 165/107, 219/293, 219/341, 219/365
[51] Int. Cl. ............................................. H05b 3/60,
F28d 15/00
[50] Field of Search .................................... 219/284–
295, 341, 365, 378, 325, 326; 165/104, 107,
108; 126/101; 237/16—18

[56] References Cited
UNITED STATES PATENTS
1,503,972  8/1924  Berg ............................. 219/284X
1,730,016  10/1929  Rudd ............................. 219/285X FOREIGN PATENTS
472,838  9/1937  Great Britain ............... 219/284
430,465  6/1935  Great Britain ............... 219/284

Primary Examiner—A. Bartis
Attorney—Duckworth & Hobby

ABSTRACT: An electrode heating apparatus for controlling the heat output in an electric heating system by varying the level of an electrolyte solution in a heating chamber having electrodes therein. A heat exchanger is connected to the heating chamber for utilizing heat generated in the electrolyte solution and provision is made for a quick heat up of the electrolyte solution. Thermostatic valves control the flow of the electrolyte solution into and out of the heating chamber and thus the level of the electrolyte in the chamber which in turn determines the rate of heating of the electrolyte solution by the area of the electrodes covered by the electrolyte solution.

PATENTED MAY 4 1971   3,576,968

Robert L. Collie
INVENTOR.

BY Duckworth & Hobby
Attorney

ELECTRODE HEATING SYSTEM

BACKGROUND OF THE INVENTION

1. Field of the Invention

The present invention relates to electric heating systems and more particularly to that type of electric heater or heating system which controls the heat output of the system by varying the level of an electrolyte solution on a plurality of electrodes.

2. Description of the Prior Art

In the past, electric type heaters have included heat pumps which operate as reverse cycles of an air-conditioning system, and having heat exchangers, and the like; and strip or resistance heaters in which heating elements produce resistance to electric current passing therethrough to generate heat which is then circulated by blowers, or the like. On a smaller scale, heat pumps generally are required to operate on an air to air basis which becomes quite unsatisfactory in cold weather since the reduced heat energy in the outside air becomes more difficult to remove in such quantity as to heat the inside of a room or building. Such a system also provides substantially increased wear on the compressor of the system.

Heating strips have generally been used in conjunction with heat pumps and electrical heating systems and provide disadvantages in the safety of operation of the heating strips, but significantly, the controls to control and vary the rate of heating of the elements are expensive and generally involve complex solid-state electronic systems which cannot normally be repaired except at the factory. Thus most small heating systems in the past have utilized a system of simply switching on the strip heaters and switching them off and not bothering with the comfort factors of varying the rate of heating being produced by the elements.

It has also been suggested in the past to utilize electrodes to heat an electrolyte solution which is controlled by varying the level of the electrolyte on the electrode. Most of these prior art electrode heaters have been for the purpose of generating steam in steam boilers, or for generating hot water in hot water heaters. One such prior art electric hot water heater operates by varying the level of an insulating wall rising and falling between electrodes at varying heating rate of the electrolyte solution by the level of the insulation which prevents the flow of current between the electrodes.

Another such electrode operated water heater varies the level of the electrolyte on the electrodes by thermostatically operated sleeves rising and falling around the electrodes, while yet another such electronic water heater controls the level of the electrolyte solution around the electrodes by a thermostatically controlled motor operating to raise or lower the level of a gate.

SUMMARY OF THE INVENTION

The present invention provides an electric heating apparatus which has a relatively small heating chamber with electrodes located and extending into the heating chamber, which electrodes are adapted to heat an electrolyte solution in accordance with the varying level of the solution in the heating chamber. The heat exchanger is provided for transferring the heat in the electrolyte solution to another medium, such as air in a hot air-type heating system. A circulation pump pumps the the electrolyte solution through the system including through the heating chamber and through the heat exchanger. The rate of heating is controlled thermostatically by valves which control the flow of the electrolyte solution into the heating chamber by allowing it either to go into the chamber or to pass through a chamber bypass opening. The valve can of course be adapted to operate at either extreme allowing all the electrolyte solution to bypass the heating chamber or to allow all the electrolyte solution to proceed into the heating chamber, or it may be operated in between allowing various proportions to go through the bypass, various amounts to proceed through the heating chamber.

A second thermostatically controlled valve is completely self-contained and operates by the temperature of the electrolyte solution to prevent the electrolyte solution from leaving the chamber when the electrolyte solution is below a predetermined level. Upon reaching a predetermined level in the heating chamber the electrolyte will pass through an overflow pipe. As the electrolyte solution heats up, this valve will be opened by the heated electrolyte solution and will thereafter remain open as long as the electrolyte solution stays heated above its predetermined range of operating temperatures.

As can be seem, this second valve provides rapid heating from a cold start of the electrolyte solution in the heating system.

BRIEF DESCRIPTION OF THE DRAWINGS

Other objects, features and advantages of this invention will be apparent from a study of the written description and the drawings, in which.

DESCRIPTION OF THE PREFERRED EMBODIMENT

Figure 1:
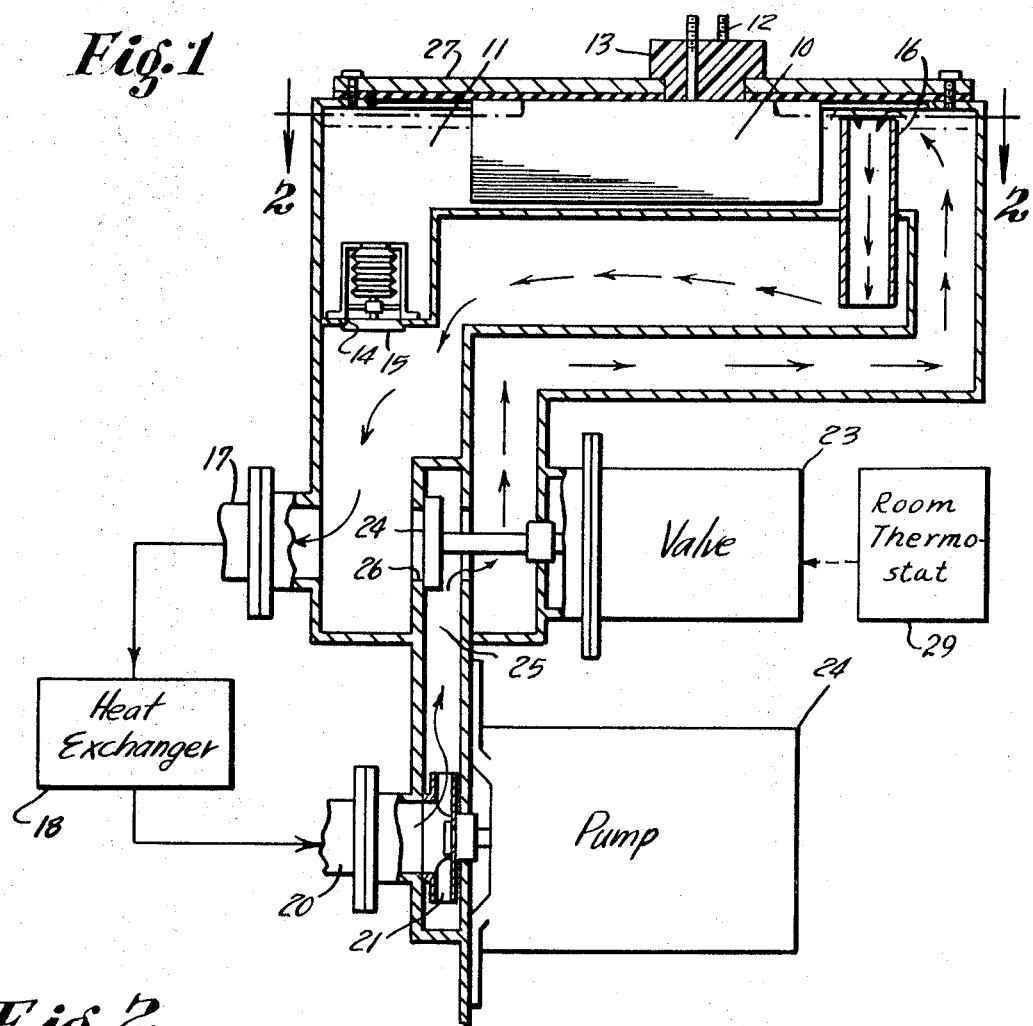
FIG. 1 is a cutaway view of one embodiment of the present invention, with the heat exchanger being shown as a block diagram.

Referring now to FIG. 1, an overall electrode heating system can be viewed having electrodes 10 extending into a heating chamber 11 and adapted to be connected to a source of electricity at connecters 12. Electrodes 10 are illustrated as plates with a connecting portion passing through an insulating material 13, but electrodes 10 could of course be of other shapes than plates without departing from the spirit and scope of the present invention. The heating chamber 11 has an exit 14 with a thermostatically controlled valve 15 located therein which valve 15 is operated by the temperature of the electrolyte solution in the heating system reaching a predetermined temperature. In addition, an overflow pipe 16 provides a second exit from the heating chamber 11 when the electrolyte solution reaches the level of the top of the overflow pipe 16. The electrolyte solution would normally not reach the top of overflow pipe 16 unless the thermostatically controlled valve 15 had completely closed the exit 14, thus allowing the electrolyte solution to rise to the level of the top of the overflow pipe 16 and cover a much greater portion of the electrodes 10 and provide a greater flow of current between the electrodes and thus a more rapid heating of the electrolyte solution.

As can be seen, the electrolyte solution leaving either through overflow pipe 16 or exit 14 passes through a pipe 17 into a heat exchanger unit 18. The heat exchanger 18 transfers heat from the electrolyte solution to another medium such as air and thus could be a coil having fins, or the like, with a blower to blow thereacross to cool the coil and the electrolyte solution therein. The cool electrolyte solution reenters the heating system through pipe 20 where it is driven by an impeller 21 of a pump 22 which may be driven by an electric motor. Pump 22 would normally be of a continuous operation duty cycle type but could, of course, have provision for switching it on and off either manually or automatically, as desired. A thermostatically controlled valve 23 is operated by an exterior thermostat 29 and is varied according to the temperature for instance in the room or a building. The thermostat valve controls the opening and closing of a gate 24 which is adapted to close an opening 25 or a bypass opening 26 or may operate between the two openings to allow both to be opened in varying proportions depending upon the location of the valve gate 24. Valve gate 24 is illustrated blocking bypass opening 26 and allowing the electrolyte solution to flow through opening 25 and into the heating chamber 11 where it is illustrated as having filled the heating chamber and proceeding out the overflow pipe 16. As can be seen, as soon as thermostat valve 15 reaches its predetermined temperature range, it will open and allow the electrolyte solution to pass through exit 14. However, the opening or changing of valve 23 gate 24 would allow the electrolyte solution to pass through the bypass 26 and partially or completely bypass the heating chamber 11, and thus control the heating rate of the electrolyte solution, and the amount of heat reaching the heat exchanger 18. The present embodiment is anticipated as having a completely sealed unit, and a removable top unit 27 is illustrated for entrance for the purpose of repair, and the like.

Figure 2:
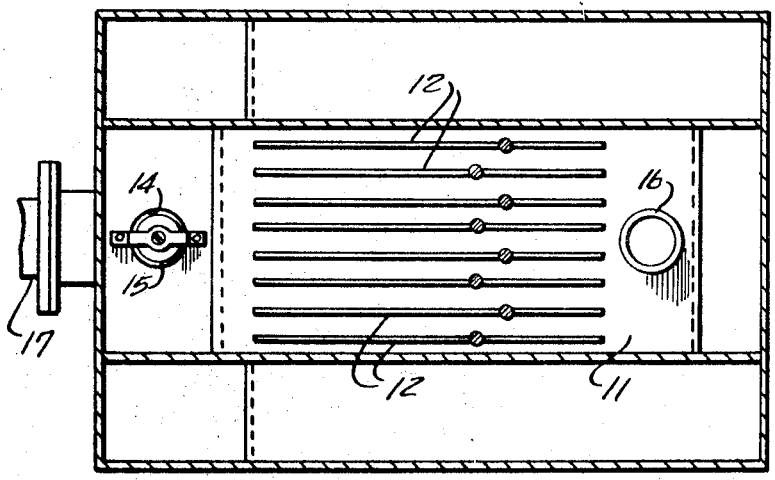
FIG. 2 is a view taken along line 2—2 of the embodiment of FIG. 1.

Referring now to FIG. 2, a view can be seen taken along line 2-2 of FIG. 1 and having a heating chamber 11, an overflow pipe 16 with a plurality of electrodes 12 with every other electrode being a neutral electrode so that electrolyte solution surrounding the electrodes will determine the heat that is generated in the electrolyte solution by the resistance of the electrolyte solution to the passage of current between the electrodes. The electrolyte solution thermostat exit control 15 opens and blocks the passage 14 to the electrolyte solution passing out of the chamber 11, as has already been described, while pipe 17 conveys the solution leaving the heating chamber to the heat exchanger. Pipe 17 also conveys any electrolyte solution that has bypassed the heating chamber through the heat exchanger.

It will be clear at this point that a heating system has been provided which is especially adapted for use in a small electric type heating system which may, for instance, be installed in the wall of a single room or may be utilized for several rooms. It should be understood, however, that the system can be used in larger systems if desired and could be combined with cooling systems as conditions require. It is also noted that while it is anticipated that the heat exchanger will be adapted for a blower to convert the heat in the electrolyte solution into heated air, this heat exchanger could also be of other types, for instance, for converting the heat in the electrolyte solution into heated water, or the like, without departing from the spirit and the scope of the invention.

This invention is not to be construed as limited to the particular forms disclosed herein, since these are to be regarded as illustrative rather than restrictive.

I claim:

1. An electric heating apparatus comprising in combination:
  a. a heating chamber having inlet means and outlet means;
  b. electrode means extending into said heating chamber and adapted to heat an electrolyte solution in accordance with the level of said electrolyte solution in said heating chamber;
  c. heat exchanger means connected to said heating chamber inlet means for receiving electrolyte solution and to said outlet means for returning electrolyte solution, and being adapted to transfer heat from said electrolyte solution to another medium;
  d. first thermostatic valve means responsive to a temperature exterior to said heating apparatus, and adapted to control the flow of said electrolyte solution through said inlet means into said heating chamber means; and
  e. second thermostatic valve means responsive to the temperature of said electrolyte solution in said heating chamber, and adapted to control the flow through said heating chamber outlet means whereby said electrolyte solution will be heated at a faster rate below a predetermined temperature.

2. The apparatus in accordance with claim 1, but including circulation pump means, adapted to circulate said electrolyte solution through said heating chamber and through said heat exchanger.

3. The apparatus in accordance with claim 2, in which said first thermostatic valve means has a bypass means adapted to bypass said heating chamber with said electrolyte solution returning from said heat exchanger when said first thermostatic valve means is in one position.

4. The apparatus in accordance with claim 3, in which said first thermostatic valve means is adapted to prevent said electrolyte solution from bypassing said heating chamber in a second position.

5. The apparatus in accordance with claim 4, in which said first thermostatic valve means is adapted to bypass a portion of said electrolyte solution returning from said heat exchanger.

6. The apparatus in accordance with claim 5, in which said heating chamber has overflow control means adapted to control the top level of electrolyte solution in said heating chamber.

7. The apparatus in accordance with claim 6, in which said electrode means has a plurality of electrodes.

8. The apparatus in accordance with claim 7 in which said electric heating apparatus is a sealed closed-loop system.

9. The apparatus in accordance with claim 8 in which said electrolyte solution is water.

10. The apparatus in accordance with claim 9 in which said water has chemical additives.